US012422381B2

(12) United States Patent
Ohno et al.

(10) Patent No.: US 12,422,381 B2
(45) Date of Patent: Sep. 23, 2025

(54) OPTICAL INSPECTION METHOD AND STORAGE MEDIUM, AND OPTICAL INSPECTION APPARATUS THAT USES THE SAME

(71) Applicant: KABUSHIKI KAISHA TOSHIBA, Tokyo (JP)

(72) Inventors: Hiroshi Ohno, Tokyo (JP); Hideaki Okano, Yokohama Kanagawa (JP); Kenta Takanashi, Kawasaki Kanagawa (JP); Takahiro Kamikawa, Yokohama Kanagawa (JP); Hiroya Kano, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 154 days.

(21) Appl. No.: 18/493,995

(22) Filed: Oct. 25, 2023

(65) Prior Publication Data

US 2024/0319111 A1 Sep. 26, 2024

(30) Foreign Application Priority Data

Mar. 22, 2023 (JP) ................................. 2023-045841

(51) Int. Cl.
*G01N 21/956* (2006.01)
*G01N 21/88* (2006.01)

(52) U.S. Cl.
CPC ... *G01N 21/95607* (2013.01); *G01N 21/8806* (2013.01); *G01N 21/8851* (2013.01); *G01N 2021/8825* (2013.01)

(58) Field of Classification Search
CPC ......... G01N 21/95607; G01N 21/8806; G01N 21/8851; G01N 2021/8825;
(Continued)

(56) References Cited

U.S. PATENT DOCUMENTS 10,257,428 B2 * 4/2019 Yoshikawa ............ G01B 11/25
10,488,347 B2 * 11/2019 Terasawa .................. G03F 1/84
(Continued)

FOREIGN PATENT DOCUMENTS

JP 2021-148531 A 9/2021

OTHER PUBLICATIONS

David J. Cuccia, et al., "Quantitation and mapping of tissue optical properties using modulated imaging," J. of Biomedical Optics, vol. 14, No. 2, DOI: 10.1117/1.3088140, 31 pages (2009).
(Continued)

*Primary Examiner* — Hung V Nguyen
(74) *Attorney, Agent, or Firm* — Finnegan, Henderson, Farabow, Garrett & Dunner, LLP

(57) ABSTRACT

According to one embodiment, an optical inspection method includes projecting first pattern light in a first basic modulation mode that periodically changes in bright and dark, onto an object, acquiring a first image by capturing an image of the object onto which the first pattern light has been projected, projecting second pattern light in a first inverted modulation mode in which bright and dark are inverted with respect to the first basic modulation mode, onto the object, acquiring a second image by capturing an image of the object onto which the second pattern light has been projected, and generating a singular light-scattered image in which a singular region including uniquely-scattered light that is extracted based at least on the first image and the second image is intensified.

14 Claims, 10 Drawing Sheets

(58) Field of Classification Search
CPC .......... G01N 2021/8829; G01B 11/254; G01B 11/25; G01B 11/2513
See application file for complete search history.

(56) References Cited

U.S. PATENT DOCUMENTS 11,244,436 B2 * 2/2022 Lee .................. G01B 11/24
11,313,794 B2 * 4/2022 Oron ................ G01N 21/453
11,333,492 B2    5/2022 Ohno et al.

OTHER PUBLICATIONS

Thomas D. O'Sullivan, et al., "Diffuse optical imaging using spatially and temporally modulated light," J. of Biomedical Optics, vol. 17, No. 7, pp. 071311-1 to 071311-14 (2012).
Akira Ishimaru, "Diffusion of light in turbid material," Applied Optics, vol. 28, No. 12, pp. 2210-2215 (1989).

* cited by examiner

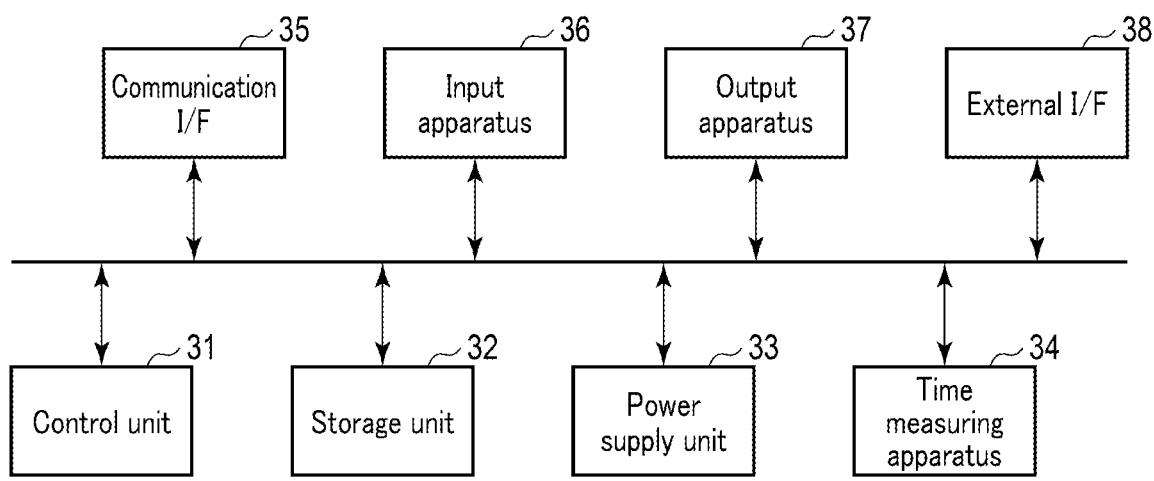
F I G. 2

OPTICAL INSPECTION METHOD AND STORAGE MEDIUM, AND OPTICAL INSPECTION APPARATUS THAT USES THE SAME

CROSS-REFERENCE TO RELATED APPLICATIONS

This application is based upon and claims the benefit of priority from the Japanese Patent Application No. 2023-045841, filed Mar. 22, 2023, the entire contents of which are incorporated herein by reference.

FIELD

Embodiments described herein relate generally to an optical inspection method and a storage medium, and an optical inspection apparatus that uses the same.

BACKGROUND

In various fields, it has become important to conduct an optical inspection of an object in a contactless manner. As a method of a contactless optical inspection, there has been pattern projection imaging that sequentially projects pattern light with spatial intensity modulation representable by a trigonometric function, onto an object, captures an image of the object each time pattern light is projected, and acquires the property of the object from a plurality of images obtained by image capturing. Here, as the pattern light has a wave closer to a trigonometric function wave, the property of the object can be acquired more accurately. Nevertheless, to accurately project pattern light with a trigonometric function wave, the number of pixels of a projected image that are necessary for the formation of pattern light becomes larger.

BRIEF DESCRIPTION OF THE DRAWINGS

FIG. 2 is a diagram showing an example of a hardware configuration of a control apparatus.

DETAILED DESCRIPTION

Figure 1:
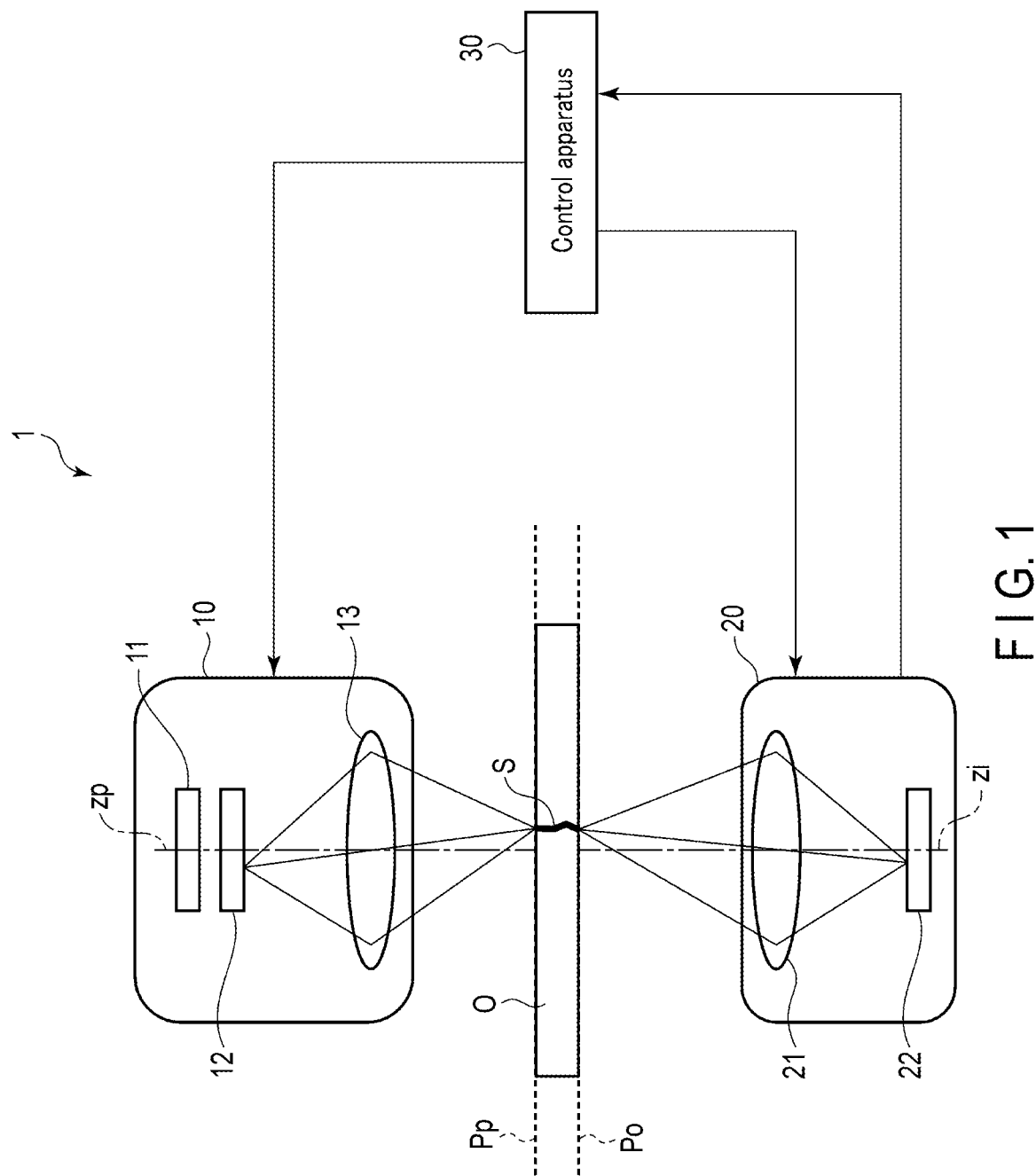
FIG. 1 is a diagram showing a configuration of an optical inspection apparatus being an example according to a first embodiment.

In general, according to one embodiment, an optical inspection method includes projecting first pattern light in a first basic modulation mode that periodically changes in bright and dark, onto an object, acquiring a first image by capturing an image of the object onto which the first pattern light has been projected, projecting second pattern light in a first inverted modulation mode in which bright and dark are inverted with respect to the first basic modulation mode, onto the object, acquiring a second image by capturing an image of the object onto which the second pattern light has been projected, and generating a singular light-scattered image in which a singular region including uniquely-scattered light that is extracted based at least on the first image and the second image is intensified.

Hereinafter, embodiments will be described with reference to the drawings. The drawings are schematic or conceptual drawings. Relationship between the thickness and the width of each portion, a ratio in size between portions, and the like that are illustrated in the drawings are not always the same as reality. In addition, even in a case where the same portion is illustrated, the portion is sometimes illustrated in different dimensions or ratios depending on the drawing. In the specification of this application and in the drawings, an element similar to that described earlier with reference to an already-described drawing is assigned the same reference numeral, and the detailed description will be appropriately omitted.

In addition, the term "light" to be used in the following description is one type of electromagnetic waves, and includes gamma rays, X-rays, ultraviolet rays, visible light, infrared rays, radio waves, and the like. Hereinafter, the description will be continued assuming that light is visible light. The visible light belongs to a wavelength band of 400 nm to 750 nm, for example. On the other hand, in a case where light is described in the following description, the light can be replaced with gamma rays, X-rays, ultraviolet rays, visible light, infrared rays, radio waves, or the like.

First Embodiment

The first embodiment will be described. FIG. 1 is a diagram showing a configuration of an optical inspection apparatus being an example according to a first embodiment. An optical inspection apparatus 1 of the first embodiment includes a projector 10, an imaging apparatus 20, and a control apparatus 30.

The projector 10 projects, onto an object O, pattern light having a spatial intensity-modulated pattern. The pattern light in an embodiment refers to light periodically changing in bright and dark in the object O. Here, periodically changing in bright and dark corresponds to changing in intensity in such a manner that a region with a large intensity and a region with a small intensity are periodically positioned. Nevertheless, periodic does not always means only a pattern repeated at a regular interval. That is, a period may vary. In other words, periodic corresponds to a state in which a region with a large intensity and a region with a small intensity are repeatedly positioned. Hereinafter, for ease of explanation, a periodic pattern means a pattern having a fixed period, unless otherwise stated. In addition, as described in detail later, in the first embodiment, the projector 10 is configured to be able to project pattern light in two modulation modes adapted to two different spatial intensity-modulated patterns.

Here, the object O has permeability for visible light, for example, and includes a uniform scattering medium. The material, the shape, and the thickness of the object O are not specifically limited. Hereinafter, the description will be continued assuming that the object O in the present embodiment is a plate having a thickness of about several millimeters and having light permeability. In addition, the description will be continued assuming that, out of two surfaces facing in a thickness direction of the object O having a plate shape, a surface onto which pattern light is projected will be regarded as a back side, and a surface to be image-captured will be regarded as a front side. In the example illustrated in FIG. 1, pattern light is projected from the surface on the back side of the object, is transmitted through the object while being scattered inside the object, reaches the surface on the front side of the object, and is emitted from the object. The object O is image-captured using light emitted from the object O. A surface to be projected is generally called a projected surface Pp, and a surface to be image-captured is called an object surface Po. That is, in the example illustrated in FIG. 1, the projected surface Pp is a surface on the back side of the object O, and the object surface Po is a surface on the front side of the object O.

In addition, in the first embodiment, the object O sometimes includes a singular region S. The singular region S is a partial region on the inside or the surface of the object O that has a unique medium or a unique shape. For example, the unique medium or the unique shape includes a foreign object, bubbles, or the like mixed into the object, a crack or a fracture generated in the object, a region with a unique density generated due to stress strain of the object, or a surface with an object surface microasperity shape or an object surface roughness different from the surrounding. Nevertheless, the unique medium or the unique shape is not limited to those listed here.

The projector 10 includes a light source 11, a spatial modulator 12, and a projection optical element 13.

The light source 11 emits light. The light source 11 can be an arbitrary light source such as a laser light source, a laser diode (LD) light source, a light emitting diode (LED) light source, a filament light source, a halogen lamp, or a xenon lamp. For example, in the first embodiment, the description will be continued assuming that the light source 11 is a white LED light source. The wavelength spectrum of white light has a significant intensity within a wavelength range from 450 nm to 750 nm. The light source 11 may be provided separately from the projector 10.

The spatial modulator 12 has a modulation surface. The modulation surface is formed by an aggregate of modulation pixels. The modulation surface independently changes light characteristic for each modulation pixel. The light characteristics include, for example, an intensity, a polarization direction, a wavelength spectrum, and the like. The modulation surface may be, for example, a digital micromirror device (DMD), a liquid crystal display (LCD) panel, a liquid crystal on silicon (LCOS) panel, or the like. The shape of the modulation surface may be any shape. For example, the shape of the modulation surface may be an area shape or a line shape.

The projection optical element 13 has a projection optical axis zp, and forms an image onto the object O along the projection optical axis zp using pattern light obtained by spatial modulation in the spatial modulator 12. A projected image adapted to the modulation surface is accordingly formed on the object O. The projection optical element 13 is a lens, for example. Nevertheless, the projection optical element 13 may be any element as long as the projection optical element 13 can form an image at an image point using light emitted from an object point in a space. In the case of an optical system defined by the projection optical element 13, an object point is a point on the modulation surface of the spatial modulator 12, and an image point is a point on the projected surface Pp of the object O.

The imaging apparatus 20 includes an image capturing optical element 21 and an image sensor 22. The imaging apparatus 20 acquires an image of the object O by image-capturing the object O using light emitted from the object surface Po of the object O.

The image capturing optical element 21 has an image capturing optical axis zi, and forms an image onto the image sensor 22 using light emitted from the object O. The image capturing optical element 21 is a lens, for example. The image capturing optical element 21 may be any element as long as the image capturing optical element 21 can form an image at an image point using light emitted from an object point in a space. In the case of an optical system defined by the image capturing optical element 21, an object point is a point on the object surface Po of the object O, and an image point is a point on a pixel surface of the image sensor 22.

The image sensor 22 includes a pixel surface. The pixel surface is formed by an aggregate of image capturing pixels including photoelectric conversion elements. Each image capturing pixel converts incident light into a pixel signal serving as an electronic signal. An aggregate of pixel values that are based on pixel signals is an image. The image sensor 22 is, for example, a complementary metal oxide semiconductor (CMOS) image sensor. The image sensor 22 may be any element as long as the image sensor 22 can acquire an image. In addition, the shape of the pixel surface may be any shape. The shape of the pixel surface may be an area shape or a line shape.

The control apparatus 30 is a computer that executes control of the optical inspection apparatus 1. The control apparatus 30 controls emission start/stop of pattern light from the projector 10, and controls the switching of a modulation mode. In addition, the control apparatus 30 generates a singular light-scattered image serving as an inspection image, from an image obtained from the imaging apparatus 20.

FIG. 2 is a diagram showing an example of a hardware configuration of the control apparatus 30. As illustrated in FIG. 2, the control apparatus 30 includes a computer in which a control unit 31, a storage unit 32, a power supply unit 33, a time measuring apparatus 34, a communication interface (I/F) 35, an input apparatus 36, an output apparatus 37, and an external interface (I/F) 38 are electrically-connected. The control apparatus 30 may include an element other than the elements illustrated in FIG. 2, and needs not include a part of the elements illustrated in FIG. 2. For example, the control apparatus 30 needs not include the time measuring apparatus 34.

The control unit 31 includes a processor such as a central processing unit (CPU), and a memory such as a random access memory (RAM) and/or a read only memory (ROM), and performs control of each constituent element of the control apparatus 30. The control unit 31 can execute processing by invoking an execution program stored in the storage unit 32.

The storage unit 32 is a medium storing information such as programs in such a manner as to be readable by a computer or the like. The storage unit 32 can be an auxiliary storage apparatus such as a hard disc drive or a solid state drive, for example. Furthermore, the storage unit 32 may include a drive. The drive is an apparatus for reading data stored in another auxiliary storage apparatus, a recording medium, and the like, and includes, for example, a semiconductor memory drive (a flash memory drive), a compact disk (CD) drive, a digital versatile disk (DVD) drive, and the like. The type of the drive may be appropriately selected in accordance with the type of the storage medium.

The power supply unit 33 supplies power to each element of the control apparatus 30. The power supply unit 33 can include, for example, a secondary battery or an alternating-current source.

The time measuring apparatus 34 is an apparatus that measure a time. For example, the time measuring apparatus 34 may be a clock including a calendar, and delivers information regarding the current date and/or time and date to the control unit 31. The time measuring apparatus 34 may be used when an inspection date and time or the like is allocated.

The communication interface 35 is a Near Field Communication (for example, Bluetooth (registered trademark)) module, a wired local area network (LAN) module, a wireless LAN module, or the like, for example, and is an interface for performing wired or wireless communication via a network. The communication performed via the network may be whichever of wired communication and wireless communication. The network may be an internetwork including the internet, or may be a network of another type such as an in-house LAN. Furthermore, the communication interface 35 may perform one-to-one communication that uses a universal serial bus (USB) cable or the like. Furthermore, the communication interface 35 may include micro USB connector. The communication interface 35 is an interface for connecting to an external apparatus such as various communication devices. The communication interface 35 is controlled by the control unit 31, and transmits various types of information to the external apparatus via a network or the like. The various types of information include an inspection image for the object O, for example.

The input apparatus 36 is an apparatus for receiving input, and can be a touch panel, a physical button, a mouse, a keyboard, and the like, for example. In addition, the output apparatus 37 is an apparatus that performs output, and is, for example, a display or the like that outputs information by display or the like.

The external interface 38 is an interface that mediates a main body of the optical inspection apparatus 1 and an external apparatus. The external apparatus may be, for example, a printer, a memory, a communication device, and or the like.

Figure 3:
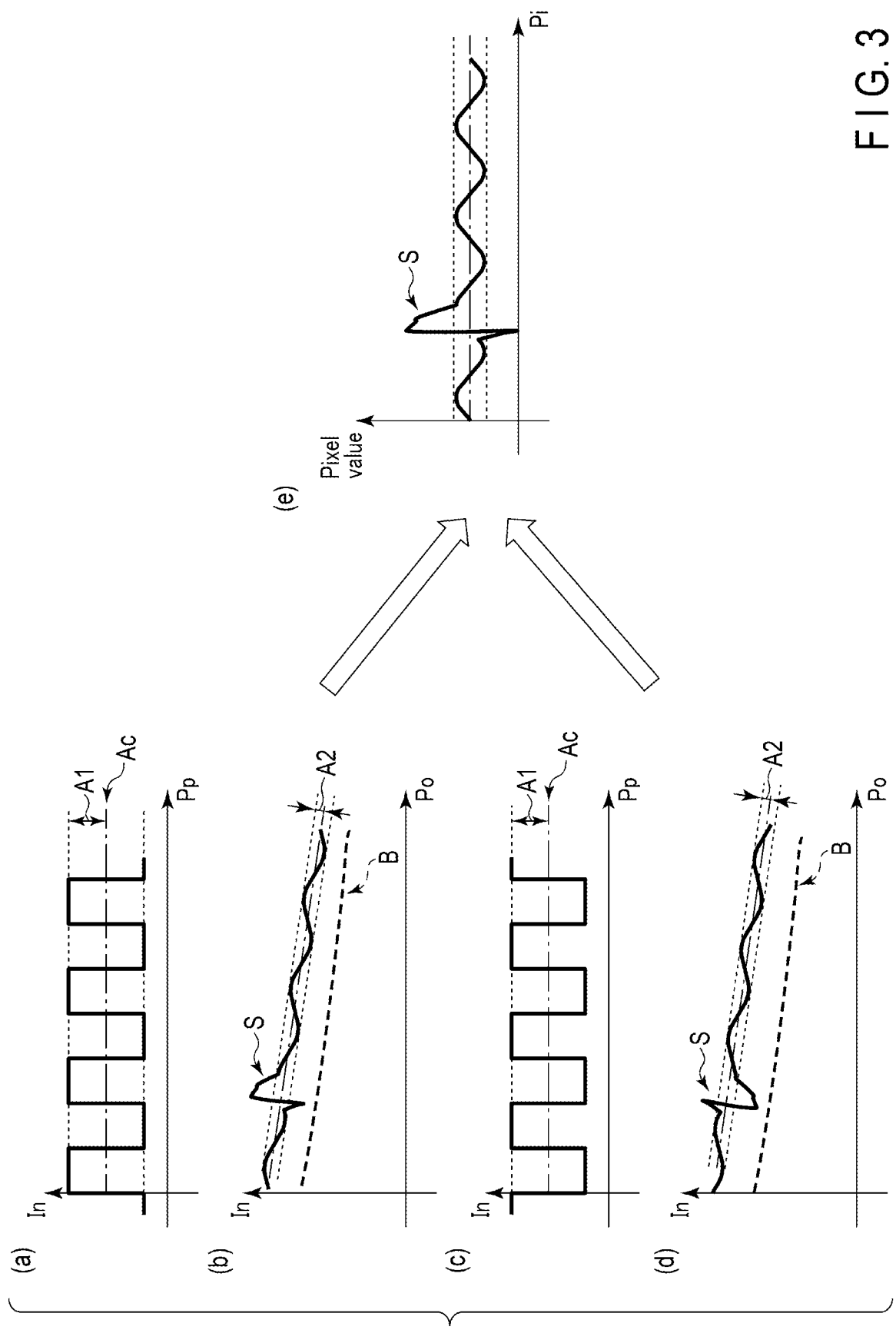
FIG. 3 is schematic diagram showing an optical inspection method according to the first embodiment.

Next, an optical inspection method that uses the optical inspection apparatus 1 will be described. FIG. 3 is schematic diagram showing an optical inspection method according to the first embodiment. In the optical inspection method in the first embodiment, pattern light having a spatial intensity-modulated pattern is projected onto an object. Then, an object is image-captured using light transmitted through the object, and an image is acquired based on a pixel signal obtained by image capturing. The pattern light is formed from white light, for example.

In the first embodiment, pattern light rays adapted to two modulation modes are emitted from the projector 10 onto an object at a time interval or as time advances. Two images adapted to pattern light rays of the respective modulation modes are accordingly acquired by the imaging apparatus 20. Based on these two images, information regarding the singular region S of the object O is acquired by the control apparatus 30.

Light that has entered the singular region S exhibits scattering characteristics different from those of light entering a uniform medium around the singular region S. That is, a light scattering distribution varies between a uniform medium and a singular region. In other words, the singular region S is a partial region exhibiting light scattering characteristics different from light scattering characteristics of a uniform medium. The singular region S may be any partial region as long as singular light scattering is caused. For example, singular light scattering occurs at a crack. Thus, an inspection of crack existence or non-existence in the object O can be performed by detecting the existence or non-existence of the singular region S of the object O.

In the first embodiment, the two different modulation modes include a basic modulation mode and an inverted modulation mode.

The (a) of FIG. 3 illustrates an example of pattern light in the basic modulation mode that is to be projected onto the projected surface Pp of the object O. A horizontal axis in (a) of FIG. 3 indicates a position on one line segment of the projected surface Pp of the object O. A vertical axis in (a) of FIG. 3 indicates an intensity In of pattern light on the projected surface Pp.

In the basic modulation mode, on the projected surface Pp of the object O, bright and dark of pattern light periodically change (modulate). Here, periodically changing in bright and dark corresponds to changing in the intensity In in such a manner that a region with a large intensity In and a region with a small intensity In are periodically positioned, when viewed in a certain line segment direction of the projected surface as illustrated in (a) of FIG. 3. That is, periodically changing in bright and dark has the same meaning as periodically changing in intensity value. Nevertheless, periodic does not means only a pattern having a fixed period. That is, a case where the period varies is also included. In other words, periodic may mean any state as long as a large intensity and a small intensity repeatedly change. Pattern light in the first embodiment can be arbitrary light periodically changing in bright and dark, such as light with a trigonometric function wave. For example, the pattern light illustrated in (a) of FIG. 3 is pattern light with a rectangular wave in which bright and dark change like a rectangular wave.

The intensity In of pattern light to be projected onto the projected surface Pp of the object O is an intensity obtained by adding an intensity of a uniform component and an intensity of a modulated component. The uniform component is sometimes called a DC component, and the modulated component is sometimes called an AC component. The uniform component is an average value or a median value of the intensity In. The modulated component vibrates around the uniform component. Therefore, an average value of the intensity of the modulated component is 0.

In addition, if an absolute value of the intensity of the modulated component is regarded as a modulated amplitude, the modulated amplitude becomes identical to an absolute value of a value obtained by subtracting the intensity of the uniform component from the intensity In. If a modulated amplitude of pattern light in the basic modulation mode that is to be projected onto the projected surface Pp of the object O is described as a first modulated amplitude A1, the first modulated amplitude A1 becomes as illustrated in (a) of FIG. 3. The first modulated amplitude A1 becomes spatially uniform. Nevertheless, the modulated amplitude is not limited to this.

The pattern light in the basic modulation mode that has been projected onto the object O is transmitted through the object O while being scattered therein. Then, the pattern light reaches a surface on the front side of the object O. In this manner, by the object O being image-captured using the light that has reached the surface on the front side of the object, an image is acquired.

In a case where the object O is a uniform medium, bright and dark of light that has reached the surface on the front side of the object O periodically change in the same manner as pattern light projected onto the object O. That is, in a case where the object O is a uniform medium, the intensity of pattern light projected onto the projected surface Pp and the intensity of light that has reached the object surface Po have positive correlation. Accordingly, the intensity In of a region on the object surface Po that faces a region with the large intensity In on the projected surface Pp becomes larger than the intensity In of a region on the object surface Po that faces a region with the small intensity In on the projected surface Pp.

Normally, background light B exists around the optical inspection apparatus 1. Then, on the object surface Po, reflected light attributed to the background light B can be generated. The object O is image-captured using light also including the reflected light attributed to the background light B. The background light B varies depending on the usage environment of the optical inspection apparatus 1, and is for example, general illumination in an office, sunlight in the open air, or sunlight entering a room from a window. That is, the background light is light other than the light rays in the two modulation modes.

The (b) of FIG. 3 illustrates an example of light on the object surface Po that corresponds to the projection of the pattern light in (a) of FIG. 3. A horizontal axis in (b) of FIG. 3 indicates a position on one line segment of the object surface Po that corresponds to one line segment of the projected surface Pp of the object O. A vertical axis in (b) of FIG. 3 indicates the intensity In of light on the object surface Po.

As illustrated in (b) of FIG. 3, by the background light B, the intensity of light on the object surface Po becomes an intensity obtained by adding a component of the background light B in addition to the uniform component and the modulated component. Thus, an image to be obtained by image capturing also includes the component of the background light aside from the uniform component and the modulated component. If a modulated amplitude of light in the basic modulation mode that has reached the object surface Po of the object O is described as a second modulated amplitude A2, the second modulated amplitude A2 is spatially uniform except for the singular region S.

The (c) of FIG. 3 illustrates an example of pattern light of the inverted modulation mode that is to be projected onto the projected surface Pp of the object O. A horizontal axis in (c) of FIG. 3 indicates a position on one line segment of the projected surface Pp of the object O. A vertical axis in (c) of FIG. 3 indicates an intensity In of pattern light on the projected surface Pp.

Also in the inverted modulation mode, similarly to the basic modulation mode, on the projected surface Pp of the object O, bright and dark of pattern light periodically change (modulate). Nevertheless, the modulated component in the inverted modulation mode is inverted from that in the basic modulation mode. That is, when the intensity In of pattern light in the basic modulation mode is the largest, the intensity In of pattern light in the inverted modulation mode becomes the smallest, and when the intensity In of pattern light in the basic modulation mode is the smallest, the intensity In of pattern light in the inverted modulation mode becomes the largest. A modulated amplitude of pattern light in the inverted modulation mode can be the same first modulated amplitude A1 as the modulated amplitude of pattern light in the basic modulation mode. Nevertheless, the modulated amplitude is not limited to this, and the modulated amplitude of pattern light in the inverted modulation mode and the modulated amplitude of pattern light in the basic modulation mode may be different.

Pattern light in the inverted modulation mode that has been projected onto the object O is transmitted through the object O while being scattered therein, similarly to the pattern light in the basic modulation mode. Then, the pattern light reaches a surface on the front side of the object O. In this manner, by the object O being image-captured using the light that has reached the surface on the front side of the object O, an image is acquired.

The (d) of FIG. 3 illustrates an example of light on the object surface Po that corresponds to the projection of the pattern light in (b) of FIG. 3. A horizontal axis in (d) of FIG. 3 indicates a position on one line segment of the object surface Po that corresponds to one line segment of the projected surface Pp of the object O. A vertical axis in (d) of FIG. 3 indicates the intensity In of light on the object surface Po.

In a case where the object O is a uniform medium, a modulated amplitude of light in the inverted modulation mode on the object surface Po can be the same second modulated amplitude A2 as the modulated amplitude of light in the basic modulation mode except for the singular region S. This is because the modulated amplitude of pattern light on the projected surface Pp is the same first modulated amplitude A1 both in the basic modulation mode and the inverted modulation mode. That is, in a case where modulated amplitudes on the projected surface Pp in the basic modulation mode and the inverted modulation mode are different, modulated amplitudes on the object surface Po in the basic modulation mode and the inverted modulation mode also become different. In addition, the component of the background light B remains unchanged between the basic modulation mode and the inverted modulation mode unless the usage environment of the optical inspection apparatus 1 changes.

After images of the object O are acquired using light in the basic modulation mode and light in the inverted modulation mode, by taking a difference in pixel value for each pixel between the image in the basic modulation mode and the image in the inverted modulation mode, a singular light-scattered image serving as an inspection image is generated. That is, a difference in pixel value between an image that is based on the pattern light in (b) of FIG. 3, and an image that is based on the pattern light in (d) of FIG. 3 is taken. The (e) FIG. 3 illustrates an example of a singular light-scattered image. A horizontal axis in (e) of FIG. 3 indicates a position on one line segment on an image plane that corresponds to one line segment of the object surface Po of the object O. The image plane is denoted by Pi. A vertical axis in (e) of FIG. 3 indicates a pixel value Pixel Value. The pixel value Pixel Value can be a value obtained by converting the intensity In of pattern light into a digital value. As illustrated in (e) of FIG. 3, in the singular light-scattered image, the uniform component and the component of the background light become nonexistent. In addition, in the singular light-scattered image, the component of the singular region S is intensified. As described above, an inspection of crack existence or non-existence in the object O can be performed by detecting the existence or non-existence of the singular region S of the object O. By the component of the singular region S being intensified, improvement in inspection accuracy of crack existence or non-existence is expected.

In a case where an image includes a plurality of color channels, a difference can be taken for each color channel. For example, by forming a color filter having a spectral sensitivity to a specific wavelength spectrum, in each image capturing pixel of the image sensor 22, an image can be caused to include color channels. For example, an image capturing pixel in which a blue color filter is formed receives light with a wavelength spectrum having a peak at a wavelength of 450 nm, and acquires a pixel signal of a blue color channel. Similarly, an image capturing pixel in which a green color filter is formed receives light with a wavelength spectrum having a peak at a wavelength of 550 nm, and acquires a pixel signal of a green color channel. In addition, similarly, an image capturing pixel in which a red color filter is formed receives light with a wavelength spectrum having a peak at a wavelength of 650 nm, and acquires a pixel signal of a red color channel. In an image, a pixel value of a pixel of the blue color channel, a pixel value of a pixel of the green color channel, and a pixel value of a pixel of the red color channel are independent. Note that, hereinafter, the description will be continued assuming that an image is a monochrome image having only one channel for white light.

Figure 4:
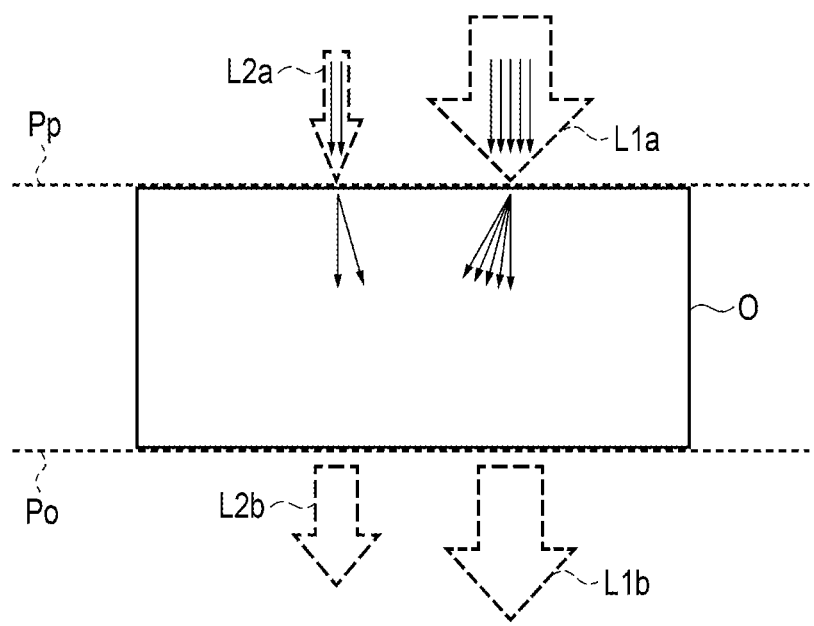
FIG. 4 is a schematic diagram of an inside of an object not including a singular region, and is a light ray diagram of light transmitted through the object.

Next, the principle of the optical inspection method will be described. First of all, a case where the object O is a uniform medium will be considered. That is, a case where the object O does not include the singular region S will be considered. FIG. 4 is a schematic diagram of an inside of the object O not including the singular region S, and is a light ray diagram of light transmitted through the object O. In FIG. 4, the intensity of light is schematically represented by the number of black arrows and the thickness of a broken line arrow.

Pattern light projected onto the projected surface Pp of the object O is transmitted through the object O while being scattered in the object O, and reaches the object surface Po of the object O. As described above, pattern light in the basic modulation mode and pattern light in the inverted modulation mode each have a bright region and a dark region when being projected onto the projected surface Pp.

In a case where the singular region S is not included, out of pattern light in the basic modulation mode and pattern light in the inverted modulation mode, light in a bright region on the projected surface Pp, that is to say, light L1a with a large intensity travels inside the object O from the projected surface Pp of the object O toward the object surface Po while being scattered. At this time, part of the light L1a scatters toward a dark region. Accordingly, the intensity of the light L1a decreases. Thus, an intensity of light L1b emitted from the object surface Po becomes smaller than the intensity of the light L1a.

On the other hand, out of pattern light in the basic modulation mode and pattern light in the inverted modulation mode, light in a dark region on the projected surface Pp, that is to say, light L2a with a small intensity travels from the projected surface Pp of the object O toward the object surface Po while being scattered. At this time, part of the light L2a scatters toward a bright region. In addition, light L2a that has not been scattered toward the bright region is combined with the light L1a scattered toward the dark region. Because an increase in intensity of the light L2a that is caused by combining with the light L1a is larger than a decrease in intensity that is caused by scattering, the intensity of the light L2a accordingly increases. While increasing in intensity in this manner, the light L2a reaches the object surface Po, and becomes light L2b. Thus, an intensity of the light L2b emitted from the object surface Po becomes larger than the intensity of the light L2a.

From the foregoing, in a case where the singular region S is not included, in both cases of the basic modulation mode and the inverted modulation mode, a contrasting difference (i.e., contrast) on the projected surface Pp becomes lower than a contrast on the object surface Po. In other words, the modulated amplitude of light on the object surface Po becomes smaller than the modulated amplitude of light on the projected surface Pp.

Figure 5:
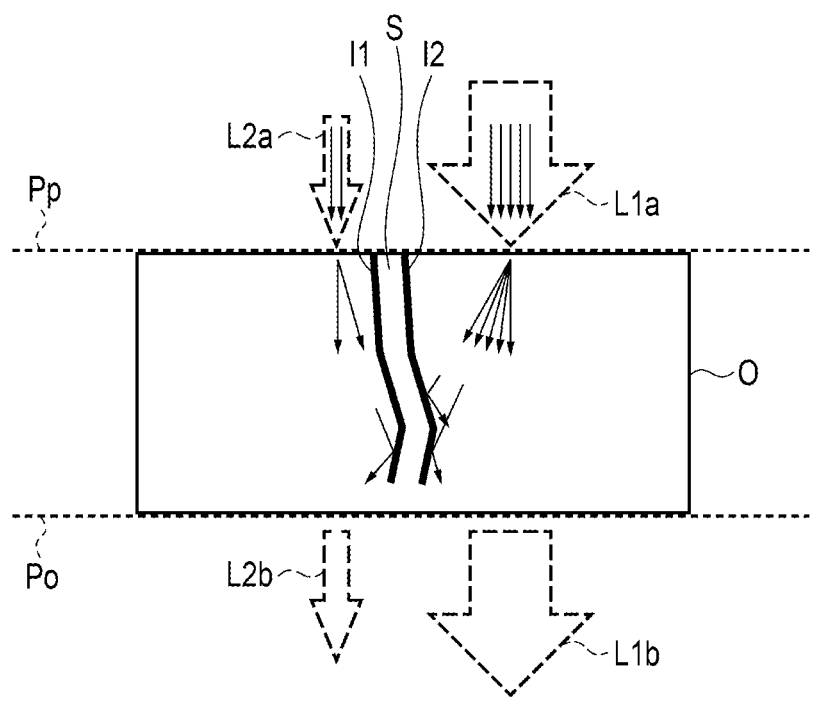
FIG. 5 is a schematic diagram of an inside of an object including a singular region, and is a light ray diagram of light transmitted through the object.

Next, a case where the object O includes the singular region S will be considered. FIG. 5 is a schematic diagram of an inside of the object O including the singular region S, and is a light ray diagram of light transmitted through the object O. Also in FIG. 5, similarly to FIG. 4, the intensity of light is schematically represented by the number of black arrows and the thickness of a broken line arrow. Note that, in the example illustrated in FIG. 5, the singular region S is a crack, for example. Generally, a crack has two facing interfacial surfaces called a first interfacial surface I1 and a second interfacial surface I2. In the example, it is assumed that air exists between the first interfacial surface I1 and the second interfacial surface I2. Nevertheless, in the crack, a medium that is other than air, such as liquid or a solid foreign object, for example, may exist.

Even in a case where the object O includes the singular region S, similarly to the case where the object O does not include the singular region S, pattern light in the basic modulation mode and pattern light in the inverted modulation mode each have a bright region and a dark region when being projected onto the projected surface Pp.

It is assumed that the singular region S exists between the bright region and the dark region, for example. Also in this case, out of pattern light in the basic modulation mode and pattern light in the inverted modulation mode, light in a bright region on the projected surface Pp, that is to say, light L1a with a large intensity travels from the projected surface Pp of the object O toward the object surface Po while being scattered. Part of the scattered light L1a tries to travel toward the dark region, and reaches the singular region S. Nevertheless, the light L1a that has reached the singular region S is reflected by the second interfacial surface I2 of the singular region S. Such reflection occurs because there is a large refractive index difference between air included in the second interfacial surface I2 of the singular region S and the object. Generally, if a refractive index becomes discontinuous, reflection occurs. Then, due to such reflection, the light L1a that has reached the singular region S cannot travel toward the dark region. Thus, an intensity of light L1b emitted from the object surface Po remains unchanged from the intensity of the light L1a.

On the other hand, out of pattern light in the basic modulation mode and pattern light in the inverted modulation mode, light in a dark region on the projected surface Pp, that is to say, light L2a with a small intensity also travels from the projected surface Pp of the object O toward the object surface Po while being scattered. Part of the scattered light L2a tries to travel toward the bright region, and reaches the singular region S. Nevertheless, the light L2a that has reached the singular region S is reflected by the first interfacial surface I1 of the singular region S. Then, due to such reflection, the light L2a that has reached the singular region S cannot travel toward the bright region. Thus, an intensity of the light L2b emitted from the object surface Po remains unchanged from the intensity of the light L2a.

From the foregoing, in a case where the singular region S is included, in both cases of the basic modulation mode and the inverted modulation mode, a contrast on the projected surface Pp becomes almost the same as a contrast on the object surface Po. In other words, as for light that has passed through the singular region S and the vicinity of the singular region S, the modulated amplitude of light on the object surface Po and the modulated amplitude of light on the projected surface Pp become almost the same.

To sum up the foregoing, in a case where the singular region S does not exist in the object O, in both cases of the basic modulation mode and the inverted modulation mode, the modulated amplitude on the object surface Po becomes smaller than the modulated amplitude on the projected surface Pp. That is, the modulated amplitude on the object surface Po attenuates as compared with the modulated amplitude on the projected surface Pp. On the other hand, in a case where the singular region S exists in the object O, in both cases of the basic modulation mode and the inverted modulation mode, the modulated amplitude on the object surface Po in the singular region S and in the vicinity of the singular region S becomes almost the same as the modulated amplitude on the projected surface Pp in the singular region S and in the vicinity of the singular region S. That is, the modulated amplitude on the object surface Po has not attenuated as compared with the modulated amplitude on the projected surface Pp. Accordingly, on an object surface, the modulated amplitude on the object surface Po in the singular region S and in the vicinity of the singular region S becomes larger as compared with the modulated amplitude on the object surface Po in a region other than the singular region S and the vicinity of the singular region S.

As described above, each pixel of a captured image has a pixel value obtained by superimposing three components corresponding to the background light component, the uniform component, and the modulated component. Here, by calculating a singular light-scattered image by subtracting an image in the basic modulation mode from an image in the inverted modulation mode, the background light component and the uniform component can be removed. On the other hand, because the positive and negative signs of the modulated component are inverted between the basic modulation mode and the inverted modulation mode, the modulated component in the singular light-scattered image remains without being removed. Furthermore, among modulated components, the modulated amplitude in the singular region S becomes larger than the modulated amplitude of a region other than the singular region S. This is because, as described above, while the modulated amplitude on the object surface Po in the singular region S and in the vicinity of the singular region S does not attenuate as compared with the modulated amplitude on the projected surface Pp, the modulated amplitude on the object surface Po in a region other than the singular region S and the vicinity of the singular region S attenuates as compared with the modulated amplitude on the projected surface Pp.

From the foregoing, a position of a pixel in a singular light-scattered image that has a pixel value equal to or larger than a threshold value, for example, can be identified as a position of the singular region S. By such an inspection of existence or non-existence of the singular region S, an inspection of a foreign object or bubbles mixed into the object, a crack or a fracture generated in the object, a region with a unique density generated due to stress strain of the object, or a surface with an object surface microasperity shape different from the surrounding, a surface with an object surface roughness different from the surrounding, or the like can be accurately performed.

Figure 6:
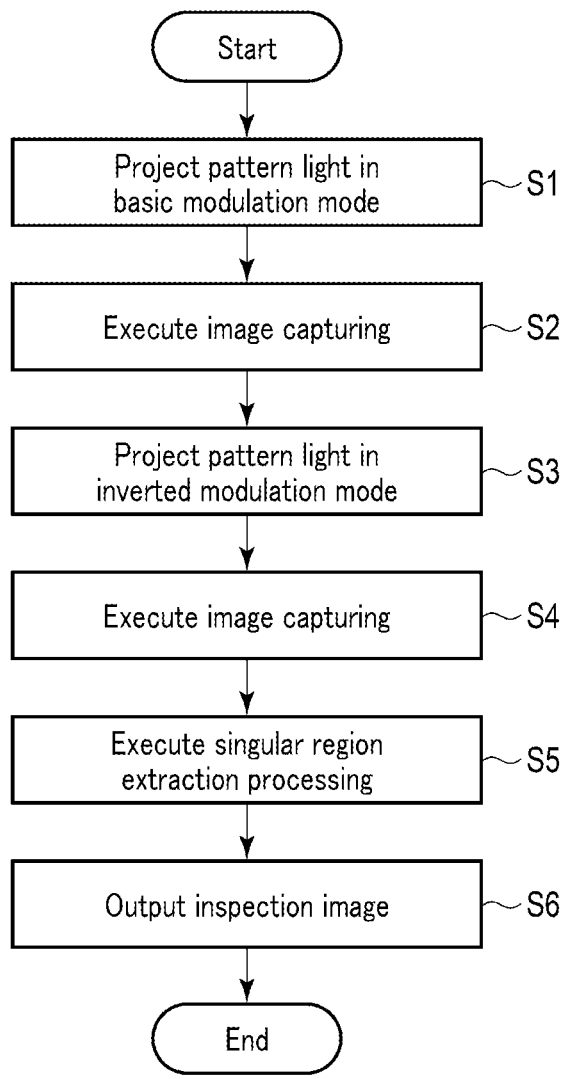
FIG. 6 is a flowchart showing an optical inspection method according to the first embodiment.

FIG. 6 is a flowchart showing an optical inspection method according to the first embodiment. An operation in FIG. 6 can be controlled by the control unit 31 of the control apparatus 30.

In Step S1, the control unit 31 causes pattern light in the basic modulation mode to be projected onto the object O from the projector 10. In Step S2, the control unit 31 causes the imaging apparatus 20 to execute image capturing of the object O. An image in the basic modulation mode that has been obtained by image capturing executed by the imaging apparatus 20 is held in a predetermined storage region of the storage unit 32 of the control apparatus 30. The operation in Step S1 and the operation in Step S2 may be sequentially performed, or may be simultaneously performed.

In Step S3, the control unit 31 causes pattern light in the inverted modulation mode to be projected onto the object O from the projector 10. In Step S4, the control unit 31 causes the imaging apparatus 20 to execute image capturing of the object O. An image in the inverted modulation mode that has been obtained by image capturing executed by the imaging apparatus 20 is held in a storage region of the storage unit 32 of the control apparatus 30 that is different from the storage region in which the image in the basic modulation mode is stored. The operation in Step S3 and the operation in Step S4 may be sequentially performed, or may be simultaneously performed.

In Step S5, the control unit 31 calculates, as singular region extraction processing, a difference in a pixel value of each pixel between the image in the inverted modulation mode and the image in the basic modulation mode. By the singular light-scattered image serving as an inspection image that is obtained by the singular region extraction processing, the singular region S is intensified as compared with other regions of a uniform medium.

In Step S6, the control unit 31 outputs the inspection image for the object O. After that, the processing in FIG. 6 ends. For example, the control unit 31 displays the inspection image on the display of the output apparatus 37. Alternatively, the control unit 31 transmits the inspection image to an analysis apparatus (not illustrated) using the communication interface 35. The analysis apparatus analyzes the existence or non-existence of a defect such as a crack by comparing a pixel value of each pixel of the inspection image with a prestored threshold value indicating the singular region S, for example. Such analysis may be performed by the control unit 31.

As described above, in the first embodiment, pattern light in the basic modulation mode that has a pattern periodically changing in bright and dark, and pattern light in the inverted modulation mode that has a pattern in which a bright-and-dark pattern is inverted from that in the basic modulation mode are projected onto an object, and a singular light-scattered image is generated from two images obtained by image-capturing the object. In the singular light-scattered image, the singular region of the object can be intensified.

Thus, information regarding the singular region of the object can be acquired from the singular light-scattered image. In addition, in the first embodiment, even if arbitrary pattern light periodically changing in bright and dark is used, information regarding a singular region can be extracted accurately.

Here, in the first embodiment, the description has been given assuming that the intensity In on the projected surface Pp of pattern light in the basic modulation mode and the intensity In on the projected surface Pp of pattern light in the inverted modulation mode are the same. Nevertheless, the intensity In on the projected surface Pp of pattern light in the basic modulation mode and the intensity In on the projected surface Pp of pattern light in the inverted modulation mode need not be the same. Similarly, in the first embodiment, the description has been given assuming that the modulated amplitude on the projected surface Pp of pattern light in the basic modulation mode and the modulated amplitude on the projected surface Pp of pattern light in the inverted modulation mode are the same. Nevertheless, the modulated amplitude on the projected surface Pp of pattern light in the basic modulation mode and the modulated amplitude on the projected surface Pp of pattern light in the inverted modulation mode need not be the same. In a case where the intensity In or the modulated amplitude on the projected surface Pp varies between pattern light in the basic modulation mode and pattern light in the inverted modulation mode, in the singular region extraction processing, it is sufficient that a difference is taken after pixel values of the image in the basic modulation mode and the image in the inverted modulation mode are normalized in accordance with an intensity ratio or a modulated amplitude ratio.

In addition, in the first embodiment, the object O is image-captured using light transmitted through from the surface on the back side of the object O to the surface on the front side. In contrast to this, the object O may be image-captured using light reflected on the surface on the back side of the object O. In this case, the projector 10 and the imaging apparatus 20 are both installed on the surface on the back side of the object O. In addition, in this case, the projected surface Pp and the object surface Po of the object O both become surfaces on the back side of the object O.

Modified Example of First Embodiment

A modified example of the first embodiment will be described. In the first embodiment, white light is assumed to be used as pattern light in the basic modulation mode and pattern light in the inverted modulation mode. In contrast to this, in the modified example of the first embodiment, pattern light in the basic modulation mode and pattern light in the inverted modulation mode have different wavelength spectra. For example, pattern light in the basic modulation mode is blue light, and pattern light in the inverted modulation mode is red light. The blue light is light having a peak wavelength at the wavelength of 450 nm, and the red light is light having a peak wavelength at the wavelength of 650 nm, for example. Nevertheless, a combination of pattern light in the basic modulation mode and pattern light in the inverted modulation mode is not limited to this. That is, a combination of pattern light in the basic modulation mode and pattern light in the inverted modulation mode is only required to be a combination of different wavelength spectra.

The image sensor 22 in the modified example of the first embodiment is configured to be able to independently receive pattern light in the basic modulation mode and pattern light in the inverted modulation mode that have different wavelength spectra. For example, the image sensor 22 includes an image capturing pixel having spectral sensitivity to red light, and an image capturing pixel having spectral sensitivity to blue light. An image acquired by the image sensor 22 accordingly includes a color channel corresponding to red light, and a color channel corresponding to blue light. The image in the basic modulation mode can be acquired from the color channel corresponding to red light. Similarly, the image in the inverted modulation mode can be acquired from the color channel corresponding to blue light.

Figure 7:
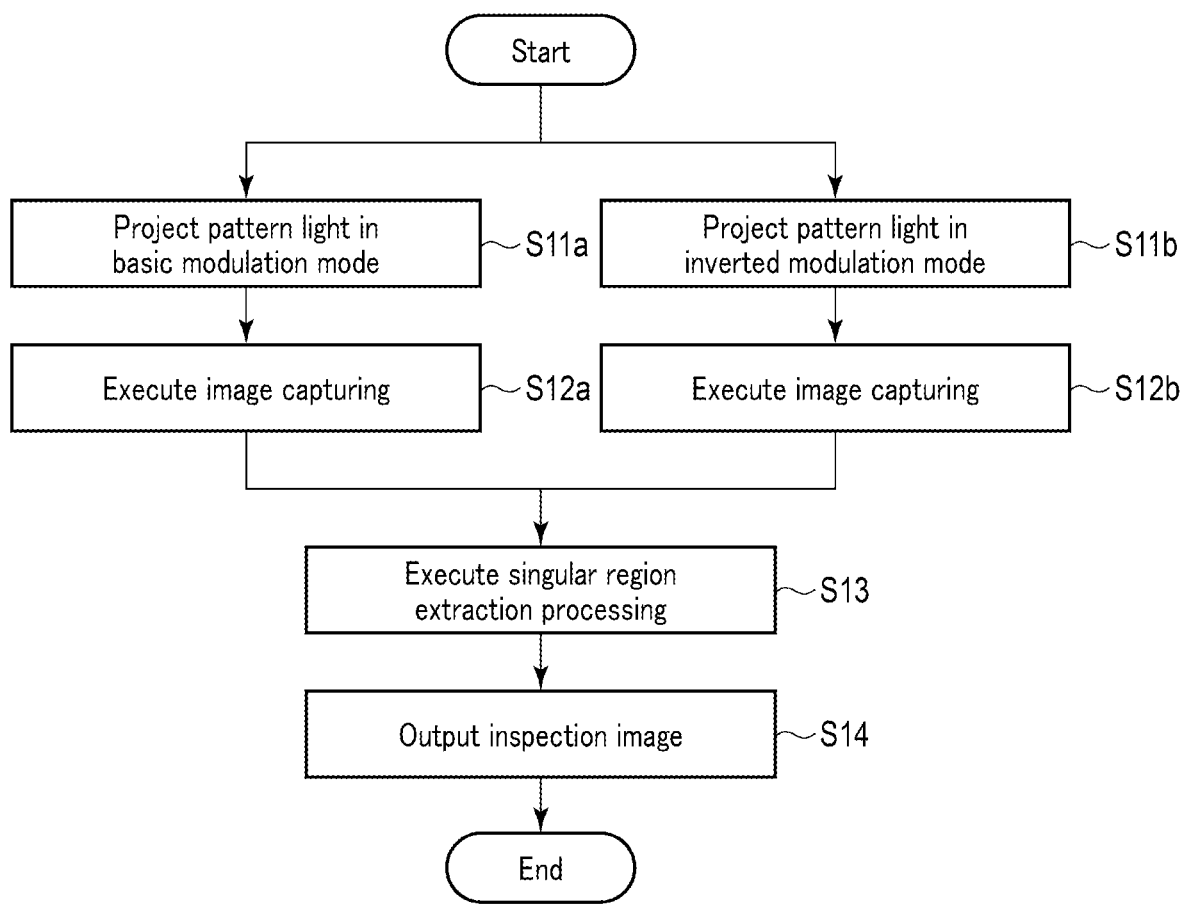
FIG. 7 is a flowchart showing an optical inspection method according to a modified example of the first embodiment.

FIG. 7 is a flowchart showing an optical inspection method according to a modified example of the first embodiment. An operation in FIG. 7 can be controlled by the control unit 31 of the control apparatus 30.

In Step S11a, the control unit 31 causes pattern light in the basic modulation mode to be projected onto the object O from the projector 10. In addition, in Step S11b, the control unit 31 causes pattern light in the inverted modulation mode to be projected onto the object O from the projector 10. That is, in the modified example of the first embodiment, projection of pattern light in the basic modulation mode and projection of pattern light in the inverted modulation mode can be performed at the same time period.

In Step S12a, the control unit 31 causes the imaging apparatus 20 to execute image capturing of the object O. An image in the basic modulation mode that has been obtained by image capturing executed by the imaging apparatus 20 is held in a predetermined storage region of the storage unit 32 of the control apparatus 30. In addition, in Step S12b, the control unit 31 causes the imaging apparatus 20 to execute image capturing of the object O. An image in the inverted modulation mode that has been obtained by image capturing executed by the imaging apparatus 20 is held in a storage region of the storage unit 32 of the control apparatus 30 that is different from the storage region of the image in the basic modulation mode. That is, in the modified example of the first embodiment, image capturing of the object O in the basic modulation mode and image capturing of the object O in the inverted modulation mode can be performed at the same time period.

In Step S13, the control unit 31 calculates, as singular region extraction processing, a difference in a pixel value of each pixel between the image in the inverted modulation mode and the image in the basic modulation mode.

In Step S14, the control unit 31 outputs the inspection image for the object O. After that, the processing in FIG. 7 ends. For example, the control unit 31 displays the inspection image on the display of the output apparatus 37. Alternatively, the control unit 31 transmits the inspection image to an analysis apparatus (not illustrated) using the communication interface 35. The analysis apparatus analyzes the existence or non-existence of a defect such as a crack by comparing a pixel value of each pixel of the inspection image with a prestored threshold value indicating the singular region S, for example. Such analysis may be performed by the control unit 31.

As described above, in the modified example of the first embodiment, by causing pattern light in the basic modulation mode and pattern light in the inverted modulation mode to have different wavelength spectra, pattern light in the basic modulation mode and pattern light in the inverted modulation mode can be emitted onto the object O at the same time period, and image capturing in the basic modulation mode and image capturing in the inverted modulation mode can be performed at the same time period. That is, it becomes unnecessary to perform processing in the inverted modulation mode at a time interval after processing in the basic modulation mode. An inspection time can be accordingly shortened.

Second Embodiment

Next, the second embodiment will be described. Hereinafter, the description common to the first embodiment will be appropriately omitted. As the basic configuration of an optical inspection apparatus according to the second embodiment, the basic configuration illustrated in FIGS. 1 and 2 can be applied.

In the first embodiment, pattern light in the basic modulation mode and pattern light in the inverted modulation mode are assumed to be arbitrary light periodically changing in bright and dark. Here, by a size of a modulation pixel on a modulation surface of a spatial modulator and a projection optical element, the resolution of a projected image to be formed on a projected surface is defined. Specifically, a product of a magnification ratio of the projection optical element and the size of the modulation pixel becomes the size of a projection pixel included in a projected image to be projected. In a projected image formed by projection pixels with a large size, sensitivity to a small singular region declines. In addition, to accurately reproduce a projected image including a curved line such as a trigonometric function wave, a large number of modulation pixels are required. On the other hand, a rectangular wave, a triangular wave, and a polygon wave can be accurately reproduced with a small number of modulation pixels. In the second embodiment, the description will be given of an example of pattern light in which an inspection of a singular region can be accurately executed with a small number of modulation pixels.

FIGS. 8A, 8B, 8C, and 8D are diagrams each showing an example of pattern light according to the second embodiment. A vertical axis in FIG. 8A, 8B, 8C, or 8D indicates an intensity In of pattern light, and a horizontal axis indicates a position of a projection pixel on one line segment of a projected surface Pp of an object O. For example, the direction of the one line segment is identical to the direction of an x-axis of the projected surface Pp.

Figure 8A:
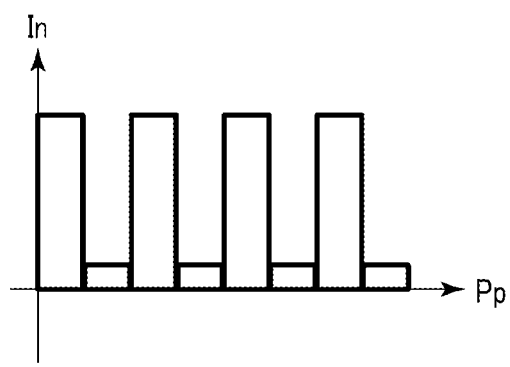
FIG. 8A is a diagram showing an example of pattern light according to a second embodiment.

FIG. 8A is a diagram showing pattern light with a rectangular wave having two projection pixels corresponding to a bright projection pixel and a dark projection pixel, as a period. A modulated component that can be formed by the smallest number of projection pixels is a rectangular wave having two projection pixels as a period that is illustrated in FIG. 8A. That is, pattern light with a rectangular wave having two projection pixels as a period includes the modulated component with the smallest period. Such pattern light with a rectangular wave having two projection pixels as a period has sensitivity also to a small singular region S.

Figure 8B:
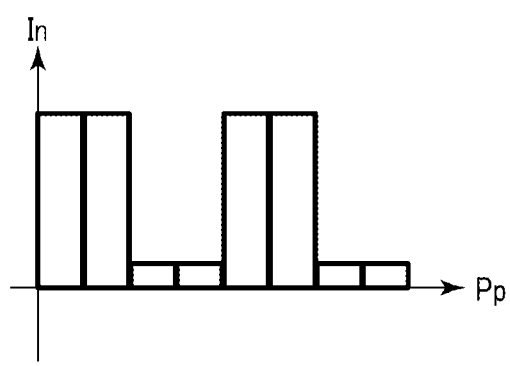
FIG. 8B is a diagram showing an example of pattern light according to the second embodiment.

FIG. 8B is a diagram showing pattern light with a rectangular wave having four projection pixels as a period that serves as pattern light with a rectangular wave having an even multiple number of projection pixels as a period. As described above, the intensity of the modulated component is an intensity obtained by subtracting an intensity of a uniform component from an intensity In of pattern light. Therefore, the intensity of the modulated component changes in such a manner that positive and negative signs alternately switches on a base of 0. At this time, if the number of projection pixels is made equal between a positive region and a negative region, a period always becomes an even number. That is, by using an even multiple number of projection pixels as a period, a rectangular wave unbiased in a positive or negative direction can be generated. With this configuration, when pattern light passes through a uniform medium of the object O, as compared with a case where a rectangular wave is biased in a positive or negative direction, a modulated amplitude can be decreased quickly. As described above, a decrease in modulated amplitude that is caused when pattern light passes through a uniform medium of the object O leads to a reduction in contrast. In this manner, the projection of pattern light with a rectangular wave unbiased in a positive or negative direction can relatively enhance contrast of pattern light passing through the singular region S.

Figure 8C:
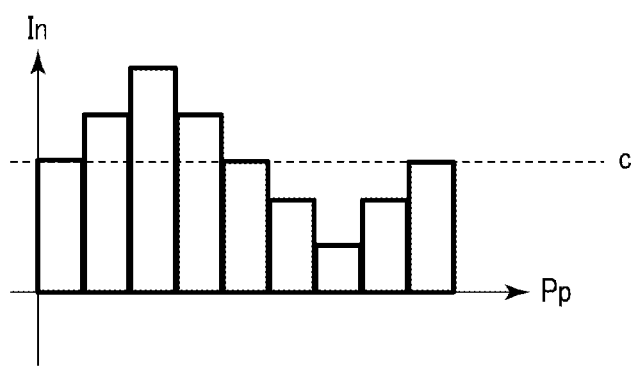
FIG. 8C is a diagram showing an example of pattern light according to the second embodiment.
Figure 8D:
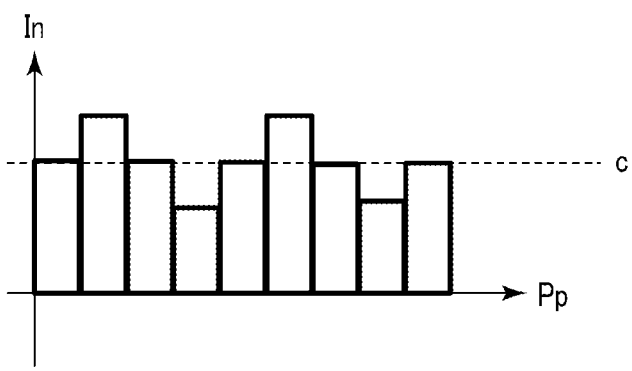
FIG. 8D is a diagram showing an example of pattern light according to the second embodiment.

FIG. 8C is a diagram showing pattern light with an uneven wave having eight projection pixels as a period. In the pattern light in FIG. 8C, the number of projection pixels in a positive region and the number of projection pixels in a negative region are each four. In addition, FIG. 8D is a diagram showing pattern light with an uneven wave having an even multiple number of projection pixels as a period. In the pattern light in FIG. 8D, the number of projection pixels in a positive region and the number of projection pixels in a negative region are each two. Here, unlike pattern light with a rectangular wave, in pattern light with an uneven wave, the modulated amplitude is not constant for each projection pixel. Nevertheless, in both of the pattern light in FIG. 8C and the pattern light in FIG. 8D, similarly to the case of the rectangular wave, a contrast of pattern light passing through the singular region S can be relatively enhanced.

Next, an effect of the second embodiment will be described. It is known that, in a steady state, light scattering can be predicted using a light diffusion equation. The light diffusion equation has an assumption that isotropic scattering occurs at a medium point in an object. If the light diffusion equation is used, the following description can be given for a modulated component φ of a scattering intensity of light propagating in the object.

$$\nabla^2 \phi - \mu_a^2 \phi = -3\mu_t \Phi \qquad (1)$$

Here, $\mu_a$ denotes an effective absorption coefficient, and $\mu_t$ denotes an effective propagation coefficient. In addition, $\Phi$ denotes an intensity of a modulated component of pattern light to be projected.

In Formula (1), if the modulated component of pattern light is inverted, that is to say, if $\Phi$ is changed to $-\Phi$, Formula (1) becomes Formula (2).

$$\nabla^2 \phi - \mu_a^2 \phi = 3\mu_t \Phi \qquad (2)$$

At this time, the modulated component φ of light propagating in the object that satisfies Formula (2) becomes a modulated component obtained by inverting a solution obtained by Formula (1). That is, the modulated component −φ being a modulated component obtained by inverting a positive/negative sign of the solution q obtained by Formula (1) becomes a solution of Formula (2).

As described above, if a modulated component of pattern light to be projected onto a projected surface is inverted, a modulated component of pattern light that reaches an object surface is also inverted. The same applies to a case where an object is a uniform medium, and a case where an object includes a singular region. In a case where an object includes a singular region, a coefficient µ spatially has a distribution. That is, the coefficient µ depends on a spatial position.

In this manner, by the modulated component being inverted, when a difference between the image in the basic modulation mode and the image in the inverted modulation mode is taken in the singular region extraction processing, a modulated component remains. On the other hand, because the uniform component and the background light component are not inverted, the uniform component and the background light component are removed by the taking the difference. That is, by the singular region extraction processing, only a modulated component can be extracted.

In the following description, it is assumed that a projected surface is a surface parallel to an xy plane, and a projection optical axis is a z-axis vertical to the xy plane. In addition, it is assumed that pattern light has a rectangular wave in which an intensity modulates in an x direction. Furthermore, pattern light is assumed to be pattern light with an intensity periodically modulating in the x direction. At this time, an intensity Φ of a modulated component of pattern light can be generally described by adding trigonometric functions. This is also called Fourier series expansion or Fourier transformation. That is, the intensity Φ can be described as represented by Formula (3) using a cosine function and a sine function.

$$\Phi = \frac{\alpha_0}{2} + \sum_{m=1}^{\infty} \alpha_m \cos(k_m x) + \sum_{m=1}^{\infty} \beta_m \sin(k_m x) \qquad (3)$$

Here, it is assumed that $\alpha_m$ and $\beta_m$ are actual number coefficients, and m is an integer equal to or larger than 1. In addition, $k_m$ denotes a spatial frequency (wave number). If a space period is denoted by $\Lambda$, the spatial frequency $k_m$ is represented by Formula (4).

$$k_m = \frac{2\pi m}{\Lambda} \qquad (4)$$

For example, a rectangular wave with a modulated amplitude of 0.5 can be described as in Formula (5) from Formula (3).

$$\Phi = \sum_{m=1}^{\infty} \frac{1-(-1)^m}{\pi m} \sin(k_m x) \qquad (5)$$

If the right side of Formula (5) is described up to the third term, Formula (6) is obtained.

$$\Phi = \frac{2}{\pi} \sin\left(\frac{2\pi}{\Lambda} x\right) + \frac{2}{3\pi} \sin\left(\frac{6\pi}{\Lambda}\right) + \frac{2}{5\pi} \sin\left(\frac{10\pi}{\Lambda}\right) \qquad (6)$$

Here, the first term of the right side corresponds to a mode in which an intensity modulates with the space period $\Lambda$. The first term of the right side is called a basic mode. On the other hand, the second term of the right side corresponds to a mode in which an intensity modulates with ⅓ of the space period $\Lambda$. The second term of the right side is called a third harmonic mode. Similarly, the third term of the right side corresponds to a mode in which an intensity modulates with ⅕ of the space period $\Lambda$. The third term of the right side is called a fifth harmonic mode. Note that the second term and subsequent terms of the right side are sometimes called a harmonic mode.

In Formula (6), the first term of the right side, that is to say, a coefficient in the basic mode is 2/π. 2/π is about 0.64, which is larger than ½ (i.e., 0.5). From this, it can be seen that, if intensities are compared between the basic mode of the rectangular wave and a trigonometric function wave (sine wave) having a modulated amplitude of the same size as the rectangular wave, the intensity in the basic mode of the rectangular wave is larger than the intensity of the trigonometric function wave. This means that, at the largest luminance at which light can be projected by the projector 10, the basic mode of the rectangular wave can make the intensity larger than the trigonometric function wave.

The modulated component φ obtainable when pattern light propagates in an object being a uniform medium is represented by a product of a component $\varphi_{xy}$ depending only on positions x and y on a projected surface, and a $\varphi_z$ component depending only on a position z on a projection optical axis. Especially when pattern light has a rectangular wave represented by Formula (5), xy is represented by Formula (7) by solving Formula (1) using Formula (5).

$$\phi_{xy} = \sum_{m=1}^{\infty} \frac{6\mu_t}{k_{2m-1}^2 + \mu_a^2} \frac{1}{\pi(2m-1)} \sin(k_{2m-1} x) \qquad (7)$$

If the space period $\Lambda$ is made small enough in Formula (7), the spatial frequency becomes larger from Formula (4), and Formula (7) is approximated as in Formula (8).

$$\phi_{xy} = \frac{6\mu_t}{\pi\left(\left(\frac{2\pi}{\Lambda}\right)^2 + \mu_a^2\right)} \sin\left(\frac{2\pi}{\Lambda} x\right) \qquad (8)$$

That is, in a case where the space period $\Lambda$ is small enough, a component of the harmonic mode of the modulated component φ that reaches an object surface by propagating in a uniform medium does not remain, and only a component of the basic mode remains. As described above, the intensity of the basic mode of the rectangular wave is larger than the intensity of the trigonometric function wave within the range of luminance at which light can be projected by the projector 10. That is to say, under the condition where the space period $\Lambda$ is small enough, the intensity of light on an object surface that is obtainable in a case where pattern light with a rectangular wave is projected onto a projected surface becomes larger than an intensity of light on an object surface that is obtainable in a case where pattern light with a trigonometric function wave is projected onto a projected surface. The intensity of light on the object surface becoming larger means that a pixel value of a singular region in an image obtained by singular region extraction processing also becomes larger. Thus, under the condition where the space period $\Lambda$ is small enough, by projecting pattern light with a rectangular wave onto a projected surface, an inspection of existence or non-existence of a singular region can become easier rather than projecting pattern light with a trigonometric function wave. This is not limited to a case where pattern light has a rectangular wave. That is to say, under the condition where the space period $\Lambda$ is small enough, the intensity of light on an object surface that is obtainable in a case where pattern light including the harmonic mode is projected onto a projected surface becomes larger than an intensity of light on an object surface that is obtainable in a case where pattern light with a trigonometric function wave is projected onto a projected surface. Thus, by projecting pattern light with a harmonic such as a triangular wave and a polygon wave that is other than a rectangular wave, onto a projected surface, an inspection of existence or non-existence of a singular region can become easier rather than projecting pattern light with a trigonometric function wave.

As described above, in the second embodiment, by projecting pattern light including a harmonic, onto a projected surface, an inspection of existence or non-existence of a singular region can be accurately executed. In particular, a rectangular wave, a triangular wave, and a polygon wave can be accurately reproduced with a small number of modulation pixels. Thus, in the second embodiment, an inspection of a singular region can be accurately executed with a small number of modulation pixels.

Third Embodiment

Next, the third embodiment will be described. Hereinafter, the description common to the first and second embodiments will be appropriately omitted.

Figure 9:
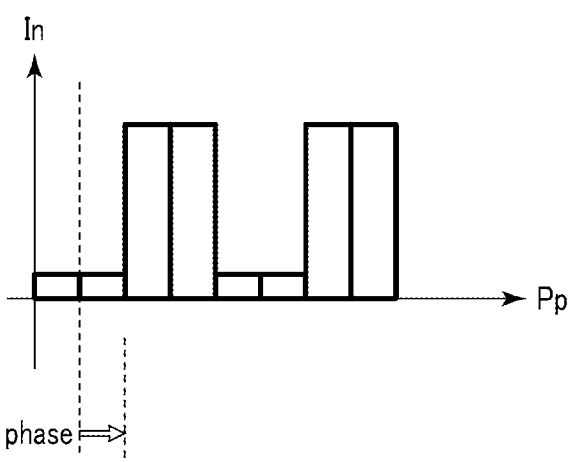
FIG. 9 is diagram showing an example of pattern light according to a third embodiment.
Figure 9:
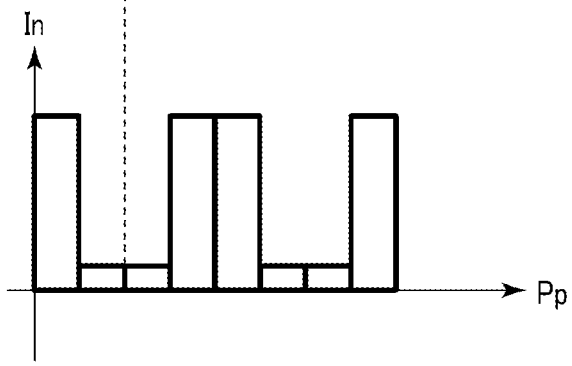

FIG. 9 is diagram showing an example of pattern light according to a third embodiment. In FIG. 9, a vertical axis indicates an intensity In of pattern light, and a horizontal axis indicates a position of a projection pixel on one line segment of a projected surface Pp of an object O. For example, the direction of the one line segment is identical to the direction of an x-axis of the projected surface Pp.

In the third embodiment, as pattern light to be projected onto a projected surface, pattern light in a modulation mode that has a reference phase, and pattern light in a modulation mode that has a phase shifted by ¼ phase from the reference phase are used. For example, when the phase of pattern light in a modulation mode that has the reference phase is 0, the phase of pattern light in a modulation mode that has the phase shifted by ¼ phase is +¼ or −¼. The pattern light in the modulation mode that has the reference phase, and the pattern light in the modulation mode that has the phase shifted by ¼ phase each include a basic modulation mode and an inverted modulation mode. Thus, in the third embodiment, pattern light to be projected onto a projected surface includes four types of pattern light corresponding to pattern light in the basic modulation mode that has the reference phase, pattern light in the basic modulation mode that has the phase shifted by ¼ phase, pattern light in the inverted modulation mode that has the reference phase, and pattern light in the inverted modulation mode that has the phase shifted by ¼ phase. Here, pattern light in FIG. 9 is pattern light with a rectangular wave having an even multiple number of projection pixels as a period that is illustrated in FIG. 8B. Nevertheless, pattern light to be used in the third embodiment is not limited to pattern light with a rectangular wave having an even multiple number of projection pixels as a period.

Hereinafter, pattern light in the basic modulation mode that has the reference phase is described as pattern light in the basic modulation mode at phase 0, pattern light in the basic modulation mode that has the phase shifted by ¼ phase is described as pattern light in the basic modulation mode at phase ¼, pattern light in the inverted modulation mode that has the reference phase is described as pattern light in the inverted modulation mode at phase 0, and pattern light in the inverted modulation mode that has the phase shifted by ¼ phase is described as pattern light in the inverted modulation mode at phase ¼.

Here, pattern light at phase 0 and pattern light at phase ¼ may be sequentially projected onto an object, or may be projected onto an object at the same time period by causing pattern light at phase 0 and pattern light at phase ¼ to have different wavelength spectra as described in the modified example of the first embodiment.

Figure 10:
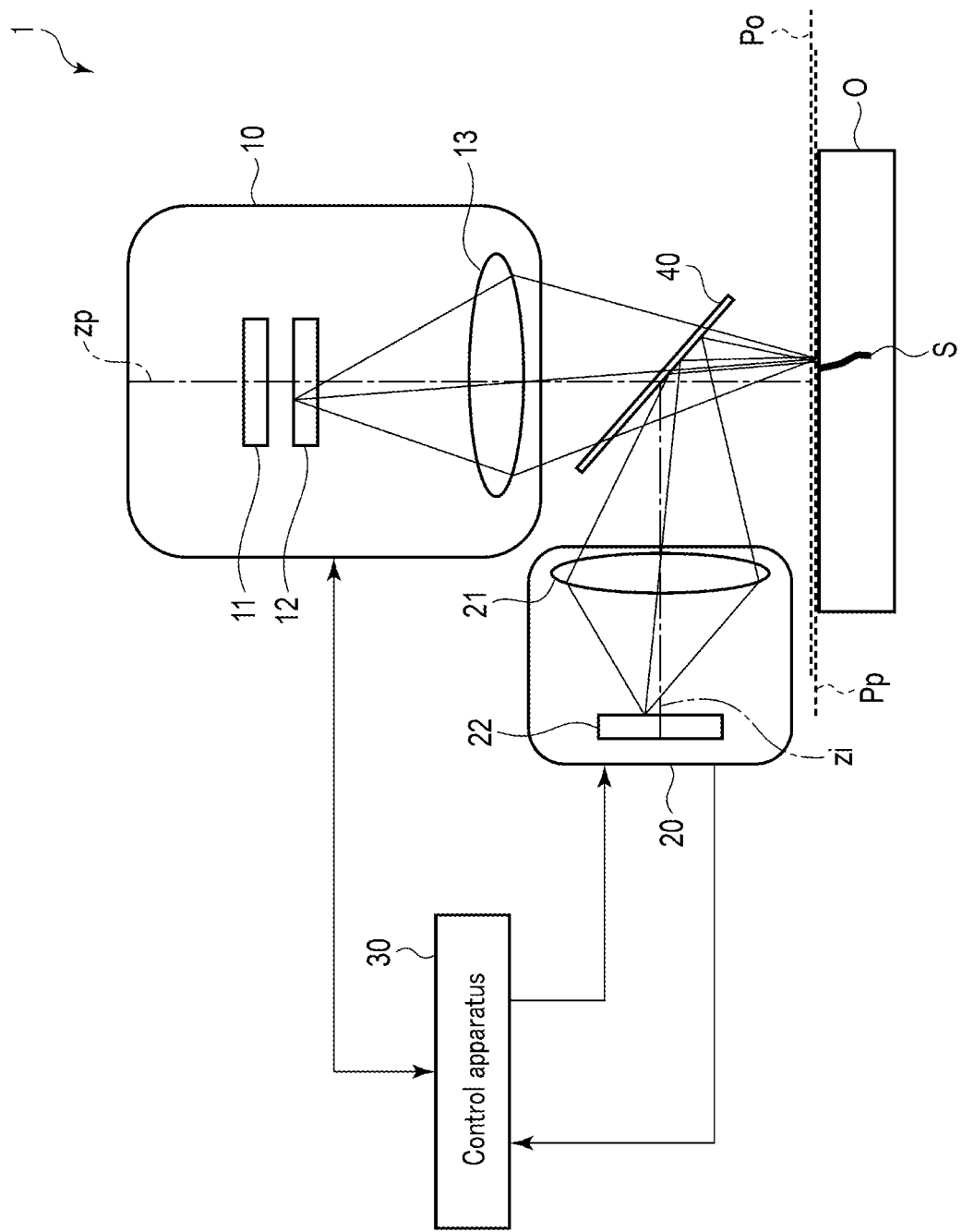
FIG. 10 is a diagram showing a configuration of an optical inspection apparatus being an example according to the third embodiment.

FIG. 10 is a diagram showing a configuration of an optical inspection apparatus being an example according to the third embodiment. An optical inspection apparatus 1 of the third embodiment includes a projector 10, an imaging apparatus 20, a control apparatus 30, and a beam splitter 40. As illustrated in FIG. 10, in the third embodiment, the projector 10 and the imaging apparatus 20 are arranged in such a manner that a projection optical axis zp of the projector 10 and an image capturing optical axis zi of the imaging apparatus 20 vertically intersect with each other in the beam splitter 40. Nevertheless, the arrangement is not limited to this, and may be oblique-incidence arrangement in which the projector 10 and the imaging apparatus 20 are arranged in such a manner that the projection optical axis zp and the image capturing optical axis zi obliquely intersect with each other.

In the third embodiment, the object O is not image-captured using light transmitted through from the surface on the back side of the object O to the surface on the front side, and the object O is image-captured using light reflected on the surface on the back side of the object O. That is, in the third embodiment, the projected surface Pp and the object surface Po of the object O both become surfaces on the back side of the object O.

The beam splitter 40 is an unpolarizing splitter or a polarizing splitter. Alternatively, the beam splitter 40 may be a dichroic mirror. In a case where the beam splitter 40 is a polarizing splitter, among pattern light rays projected onto the object O, a regular reflection component from the object O is transmitted through, and only a scatter component to be scattered and reflected is reflected toward the imaging apparatus 20. This is because polarization generally changes by scattering. As described above, a singular region S exhibits unique scattering characteristics different from those of a surrounding uniform medium. On the other hand, reflected light from the uniform medium generally includes many regular reflection components. That is, in a case where the beam splitter 40 is a polarizing splitter, it is possible to make only scattered light from the singular region easily extractable. In a case where the beam splitter 40 is an unpolarizing splitter, the projection optical axis zp and the image capturing optical axis zi can be matched.

Next, an effect of the third embodiment will be described. For example, an intensity distribution $\varphi_{A0}$ of light on an object surface that is obtainable in a case where pattern light in the basic modulation mode at phase 0 illustrated in FIG. 9 is projected onto a projected surface can be represented as in Formula (9).

$$\phi_{A0} = a\sin\left(\frac{2\pi}{\Lambda}x\right) \quad (9)$$

Here, $\Lambda$ in Formula (9) denotes a space period, and is equal to the size of the four projection pixels in the example in FIG. 9. In addition, "a" is an actual number coefficient corresponding to the coefficient in Formula (8). Similarly to Formula (8), "a" decreases if Λ becomes smaller. Note that "a sin" in Formula (9) is not "arcsin", but means that "a" is multiplied by "sin"-function.

Similarly, an intensity distribution $\varphi_{A1/4}$ of light on an object surface that is obtainable in a case where pattern light in the basic modulation mode at phase ¼ illustrated in FIG. 9 is projected onto a projected surface can be represented as in Formula (10).

$$\phi_{A1/4} = \mathrm{acos}\left(\frac{2\pi}{\Lambda}x\right) \tag{10}$$

Note that "a cos" in Formula (10) is not "arccos", but means that "a" is multiplied by "cos"-function.

The pattern light in the inverted modulation mode is pattern light obtained by inverting the pattern light in the basic modulation mode. Thus, an intensity distribution $\varphi_{B0}$ of light on an object surface that is obtainable in a case where pattern light in the inverted modulation mode at phase 0 is projected onto a projected surface, and an intensity distribution $\varphi_{B1/4}$ of light on an object surface that is obtainable in a case where pattern light in the inverted modulation mode at phase ¼ is projected onto a projected surface can be represented as in Formulae (11) and (12), respectively.

$$\phi_{B0} = -\mathrm{asin}\left(\frac{2\pi}{\Lambda}x\right) \tag{11}$$

$$\phi_{B1/4} = -\mathrm{acos}\left(\frac{2\pi}{\Lambda}x\right) \tag{12}$$

Note that "a sin" in Formula (11) is not "arcsin", but means that "a" is multiplied by "sin"-function. Note that "a cos" in Formula (12) is not "arccos", but means that "a" is multiplied by "cos"-function.

In the third embodiment, four types of pattern light are projected onto the projected surface, and an image is acquired by the imaging apparatus 20 for each pattern light. If a pixel value of an image acquired by the imaging apparatus 20 is represented as I(m,n), I(m,n) can be represented as in Formula (13). Here, (m,n) denotes a set of integers indicating a two-dimensional position of a pixel included in the image. In addition, $I_{noise}$ in Formula (13) is a pixel value indicating a component of background light. In Formula (13), $\varphi_{DC}$ is a pixel value indicating a uniform component. In Formula (13), $\varphi_{AC}$ is a pixel value indicating a modulated component, and is a value obtained by converting an intensity represented by Formula (9), (10), (11), or (12) into a pixel value. In Formula (13), $\Delta\varphi$ is a pixel value indicating a modulated component from a singular region.

$$I(m, n) = I_{noise} + \phi_{DC} + \phi_{AC} + \Delta\phi \tag{13}$$

Here, based on Formula (13), a pixel value I(m,n) of an image in the basic modulation mode at phase 0 is denoted by $I_{A0}$, a pixel value I(m,n) of an image in the basic modulation mode at phase ¼ is denoted by $I_{A1/4}$, a pixel value I(m,n) of an image in the inverted modulation mode at phase 0 is denoted by $I_{B0}$, and a pixel value of an image in the inverted modulation mode at phase ¼ is denoted by $I_{B1/4}$. In the third embodiment, as singular region extraction, two patterns of combinations of the basic modulation mode of these pixel values $I_{A0}$, $I_{A1/4}$, $I_{B0}$, and $I_{B1/4}$, and the inverted modulation mode corresponding thereto are created, a difference in each combination is taken, and an added amount is calculated. If this amount is regarded as a pixel value S of a unique light-scattered image serving as an inspection image, S is calculated by the following formula (14), for example.

$$S(m, n) = (I_{A0} - I_{B0})^2 + (I_{A1/4} - I_{B1/4})^2 \tag{14}$$

If Formulae (9), (10), (11), and (12) are substituted into Formula (14), the following formula (15) is obtained.

$$S(m, n) = 8a^2 + 4\left((\Delta\phi_0)^2 + (\Delta\phi_{1/4})^2\right) + O(a\Delta\phi) \tag{15}$$

Here, in Formula (15), $\Delta\varphi_0$ is a pixel value indicating a modulated component from a singular region at phase 0. $\Delta\varphi_{1/4}$ is a pixel value indicating a modulated component from a singular region at phase ¼. In addition, O(X) is an amount indicating an order of an argument X. If the space period Λ becomes smaller, "a" becomes smaller. Thus, if "a" is small enough, Formula (15) becomes Formula (16) as follows.

$$S(m, n) = 4\left((\Delta\phi_0)^2 + (\Delta\phi_{1/4})^2\right) \tag{16}$$

Formula (16) means that only a modulated component of a singular region is extracted by singular region extraction processing. In addition, Formula (16) means that a modulated component of a singular region is individually extracted for phase 0 and phase ¼. That is, in the third embodiment, by projecting pattern light at a plurality of phases onto an object for each of pattern light in the basic modulation mode and pattern light in the inverted modulation mode, a component of a singular region becomes larger. Thus, inspection accuracy is further improved as compared with the first embodiment.

Formula (16) is a formula obtained for pattern light modulating in the x direction. By a similar way of thinking, an effect similar to Formula (16) can be obtained also for pattern light modulating in a y direction. Furthermore, a result in the x direction and a result in the y direction and may be combined. Specifically, if a result of Formula (16) in the x direction is denoted by $S_x(m,n)$, a result of Formula (16) in the y direction is denoted by $S_y(m,n)$, and a pixel value of an inspection image is denoted by S(m,n), S(m,n) is represented by the following formula (17).

$$S(m, n) = S_x(m, n) + S_y(m, n) \tag{17}$$

Only by either one of pattern light modulating in the x direction, and pattern light modulating in the y direction, depending on the direction of a singular region, extraction accuracy of the singular region declines. By using both of pattern light modulating in the x direction, and pattern light modulating in the y direction, in combination, a singular region can be stably extracted without depending on the direction of the singular region.

Here, in a case where both of pattern light modulating in the x direction, and pattern light modulating in the y direction are used in combination, pattern light modulating in the x direction, and pattern light modulating in the y direction may be sequentially projected onto an object, or may be projected onto an object at the same time by causing pattern light modulating in the x direction and pattern light modulating in the y direction, to have different wavelength spectra as described in the modified example of the first embodiment.

Figure 11A:
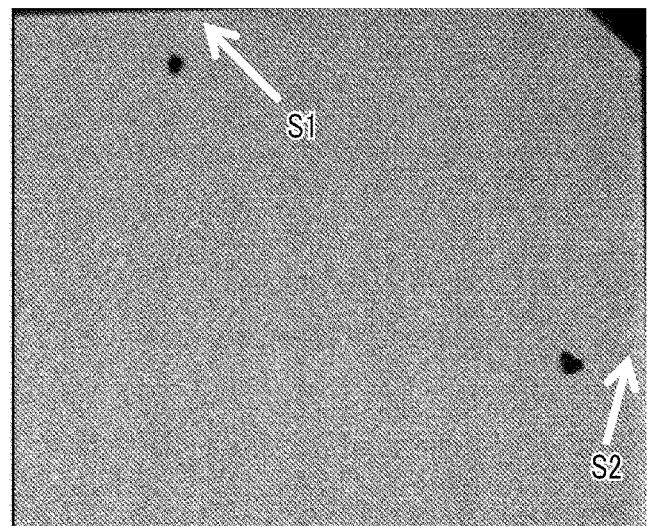
FIG. 11A is a diagram showing an image of a ceramic substrate that has been captured by a conventional camera under illumination of a normal office environment.
Figure 11B:
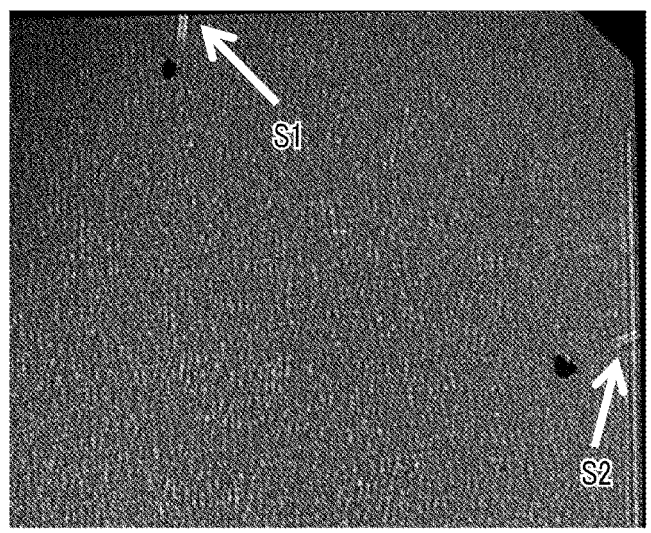
FIG. 11B is a diagram showing an image of a ceramic substrate that has been obtained by singular region extraction processing that is based on a method of the third embodiment.

FIG. 11A is a diagram showing an image of a ceramic substrate that has been captured by a conventional camera under illumination of a normal office environment. In addition, FIG. 11B is a diagram showing an image of a ceramic substrate that has been obtained by singular region extraction processing that is based on a method of the third embodiment. Here, the ceramic substrate includes two cracks. In FIGS. 11A and 11B, positions of the cracks are indicated by S1 and S2. In FIG. 11A, at the positions indicated by S1 and S2, the cracks hardly appear in an image. On the other hand, in FIG. 11B, at the positions indicated by S1 and S2, the cracks clearly appear in an image. In this manner, by projecting pattern light in the basic modulation mode and pattern light in the inverted modulation mode onto an object, a crack or the like that serves as a singular region can clearly appear in an image.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical inspection method comprising:
    projecting first pattern light in a first basic modulation mode that periodically changes in bright and dark, onto an object;
    acquiring a first image by capturing an image of the object onto which the first pattern light has been projected;
    projecting second pattern light in a first inverted modulation mode in which bright and dark are inverted with respect to the first basic modulation mode, onto the object;
    acquiring a second image by capturing an image of the object onto which the second pattern light has been projected; and
    generating a singular light-scattered image in which a singular region including uniquely-scattered light that is extracted based at least on the first image and the second image is intensified.

2. The optical inspection method according to claim 1, wherein the first pattern light includes a basic frequency component and at least one harmonic component.

3. The optical inspection method according to claim 2, wherein the first pattern light is pattern light with a rectangular wave.

4. The optical inspection method according to claim 3, wherein the first pattern light is pattern light with a rectangular wave having an even multiple number of projection pixels included in a projected image to be formed on the object by projection, as one period.

5. The optical inspection method according to claim 4, wherein the first pattern light is pattern light with a rectangular wave having the two projection pixels as one period.

6. The optical inspection method according to claim 4, wherein the first pattern light is pattern light with a rectangular wave having the four projection pixels as one period.

7. The optical inspection method according to claim 2, wherein the first pattern light is pattern light with an uneven wave.

8. The optical inspection method according to claim 7, wherein the first pattern light is pattern light with an uneven wave having eight projection pixels included in a projected image to be formed on the object by projection, as one period.

9. The optical inspection method according to claim 1,
    wherein the first pattern light and the second pattern light are pattern light rays having mutually-different wavelength spectra, and
    wherein projecting the first pattern light onto the object and projecting the second pattern light onto the object are performed at a same time period.

10. The optical inspection method according to claim 1, further comprising:
    projecting third pattern light in a second basic modulation mode that is different in phase from the first basic modulation mode, onto the object;
    acquiring at least one of the third image by capturing an image of the object onto which the third pattern light has been projected;
    projecting fourth pattern light in a second inverted modulation mode different in phase from the first inverted modulation mode, onto the object; and
    acquiring at least one of the fourth image by capturing an image of the object onto which the fourth pattern light has been projected,
    wherein the generating the singular light-scattered image comprises generating the unique light-scattered image using at least the first image, the second image, the third image, and the fourth image.

11. The optical inspection method according to claim 10,
    wherein at least any two of the first pattern light, the second pattern light, the third pattern light, and the fourth pattern light are pattern light rays having mutually-different wavelength spectra, and
    wherein projecting pattern light rays having mutually-different wavelength spectra, among the first pattern light, the second pattern light, the third pattern light, and the fourth pattern light, onto the object is performed at a same time period.

12. The optical inspection method according to claim 10,
    wherein the first basic modulation mode is a modulation mode in which bright and dark periodically change in a first direction, and
    wherein the second basic modulation mode is a modulation mode in which bright and dark periodically change in a second direction orthogonal to the first direction.

13. A computer-readable non-transitory storage medium storing an optical inspection program for causing a computer to execute:
    projecting first pattern light in a first basic modulation mode that periodically changes in bright and dark, onto an object;
    acquiring a first image by capturing an image of the object onto which the first pattern light has been projected;

projecting second pattern light in a first inverted modulation mode in which bright and dark are inverted with respect to the first basic modulation mode, onto the object;

acquiring a second image by capturing an image of the object onto which the second pattern light has been projected; and generating a singular light-scattered image in which a singular region including uniquely-scattered light that is extracted based at least on the first image and the second image is intensified.

14. An optical inspection apparatus including a processor including hardware that causes:

a projector to project first pattern light in a first basic modulation mode that periodically changes in bright and dark, onto an object;

an imaging apparatus to acquire a first image by capturing an image of the object onto which the first pattern light has been projected;

the projector to project second pattern light in a first inverted modulation mode in which bright and dark are inverted with respect to the first basic modulation mode, onto the object;

the imaging apparatus to acquire a second image by capturing an image of the object onto which the second pattern light has been projected; and to generate a singular light-scattered image in which a singular region including uniquely-scattered light that is extracted based at least on the first image and the second image is intensified.

* * * * *